United States Patent
Opran et al.

(10) Patent No.: US 9,235,273 B2
(45) Date of Patent: Jan. 12, 2016

(54) USER INTERFACE DEVICE AND METHOD

(75) Inventors: Constantin Alexandru Opran, Eindhoven (NL); Peter Tjin Sjoe Kong Tsang, Eindhoven (NL); Stuart Ronald Pill, Bedlingon (GB); Cornelis Petrus Joseph Bink, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 572 days.

(21) Appl. No.: 13/133,698

(22) PCT Filed: Dec. 10, 2009

(86) PCT No.: PCT/IB2009/055654
§ 371 (c)(1),
(2), (4) Date: Jun. 9, 2011

(87) PCT Pub. No.: WO2010/070550
PCT Pub. Date: Jun. 24, 2010

(65) Prior Publication Data
US 2011/0241822 A1    Oct. 6, 2011

(30) Foreign Application Priority Data
Dec. 15, 2008  (EP) .................................. 08171607

(51) Int. Cl.
| G05B 19/02 | (2006.01) |
| G06F 3/033 | (2013.01) |
| G06F 3/045 | (2006.01) |
| G06F 1/16  | (2006.01) |
| G06F 3/02  | (2006.01) |
| G06F 3/01  | (2006.01) |

(52) U.S. Cl.
CPC .............. *G06F 3/033* (2013.01); *G06F 1/1626* (2013.01); *G06F 1/1652* (2013.01); *G06F 3/0202* (2013.01); *G06F 3/045* (2013.01); *G06F 1/1656* (2013.01); *G06F 3/01* (2013.01)

(58) Field of Classification Search
CPC ............ G09G 5/00; G06F 2203/04102; G06F 1/1652; G06F 3/01; G06F 3/0202
See application file for complete search history.

(56) References Cited

U.S. PATENT DOCUMENTS

| 6,297,805 B1 | 10/2001 | Adler et al. |
| 7,298,365 B2 | 11/2007 | Moriyama |
| 7,394,452 B2 * | 7/2008 | Wong et al. ........... G06F 1/1626 345/156 |

(Continued)

FOREIGN PATENT DOCUMENTS

| CN | 101059950 A | 10/2007 |
| JP | 2006023892 A | 1/2006 |

(Continued)

OTHER PUBLICATIONS

Scott et al: "I Sense a Disturbance in the Force: Mobile Device Interaction With Force Sensing"; Microsoft Research Cambridge, May 2008.

(Continued)

*Primary Examiner* — Firmin Backer
*Assistant Examiner* — Adnan Aziz

(57) ABSTRACT

A user interface device including a non-flexible part; at least one flexible part coupled to the non-flexible part; and at least one sensor, for detecting bending of a respective flexible part with respect to the non-flexible part, and for producing a command in response to sensing bending of the respective flexible part.

13 Claims, 1 Drawing Sheet

(56) References Cited

U.S. PATENT DOCUMENTS

| | | | |
|---|---|---|---|
| 7,443,380 B2* | 10/2008 | Nozawa | 345/156 |
| 7,880,718 B2* | 2/2011 | Cradick et al. | 345/156 |
| 8,358,275 B2* | 1/2013 | Huitema | 345/173 |
| 2004/0008191 A1* | 1/2004 | Poupyrev et al. | 345/184 |
| 2006/0007136 A1* | 1/2006 | Nakagome | 345/156 |
| 2006/0238494 A1* | 10/2006 | Narayanaswami et al. | 345/156 |
| 2006/0274036 A1* | 12/2006 | Hioki et al. | G06F 3/0412 345/156 |
| 2007/0057935 A1 | 3/2007 | Takagi | |
| 2007/0205997 A1* | 9/2007 | Lieshout et al. | 345/204 |
| 2007/0236450 A1* | 10/2007 | Colgate et al. | 345/156 |
| 2007/0242033 A1 | 10/2007 | Cradick et al. | |
| 2009/0211377 A1* | 8/2009 | Blundred | 73/862.627 |
| 2010/0011291 A1* | 1/2010 | Nurmi | 715/702 |
| 2011/0057873 A1* | 3/2011 | Geissler et al. | 345/156 |
| 2011/0193824 A1* | 8/2011 | Modarres et al. | 345/177 |
| 2011/0227822 A1* | 9/2011 | Shai | 345/156 |

FOREIGN PATENT DOCUMENTS

| | | |
|---|---|---|
| JP | 2008116319 A | 5/2008 |
| WO | 9627891 A1 | 9/1996 |
| WO | 2005093548 A1 | 10/2005 |
| WO | 2006100514 A1 | 9/2006 |
| WO | 2007069007 A1 | 6/2007 |

OTHER PUBLICATIONS

Balakrishnan et al: "Exploring Interactive Curve and Surface Manipulation Using a Bend and Twist Sensitive Input Strip"; 1999 Symposium on Interactive 3D Graphics, Atlanta, GA., pp. 111-118.

* cited by examiner

USER INTERFACE DEVICE AND METHOD

FIELD OF THE INVENTION

The present invention relates to a user interface device and a method of controlling a device via a user interface device. In particular, but not exclusively, the present invention relates to a bendable user interface device.

BACKGROUND OF THE INVENTION

Many electronic systems have a user interface which comprises a visual indicator and a device which navigates the visual indicator enabling the user to interact with the system. These user interface devices are commonly remote from the system and connected to the system via a wired connection or wireless connection. A simple example of such a user interface device is volume control on the connection leads of a pair of headphones of a portable audio player. The volume control is more conveniently placed for the user to adjust the volume without a need to retrieve the audio player itself which may be placed in a pocket or bag etc. Further, developments of such user interface devices have evolved such that the interface devices are more complex including commonly used functions (such as play, fast forward, on/off etc.) where buttons or combinations of buttons are used to capture commands from the user to be sent to the electronic system connected to the interface device.

However, the buttons or combinations of buttons are problematical in very small devices. One solution is to provide a user interface device in which the body of the device, itself, is manipulated such as that disclosed by U.S. 2004/0008191. U.S. 2004/0008191 discloses a user interface comprising a flexible display which presents information to the user. The user can scroll the information displayed by bending the flexible display in a particular direction. The device is held with both hands to give the directional bending required to command the direction of scrolling. However, the device is cumbersome to hold and the flexing of the display makes fine changes difficult to control.

SUMMARY OF THE INVENTION

The present invention seeks to provide a user interface which is of a size and weight small enough not to hinder the user in the daily operation and to provide a user interface that is convenient and easy to operate.

This is achieved, according to a first aspect of the present invention, by a user interface device, comprising: a non-flexible part; at least one flexible part coupled to the non-flexible part; and at least one sensor, for detecting bending of a respective flexible part with respect to the non-flexible part, and for producing a command in response to sensing bending of the respective flexible part.

This is also achieved, according to a second aspect of the present invention, by a method of controlling a device via a user interface device that comprises a non-flexible part, at least one flexible part coupled to the non-flexible part, and at least one sensor, the method comprising: detecting bending of the flexible part with the sensor; and producing a command in response to said sensing to control the device.

This is also achieved according to a third aspect of the present invention, by a content playback system, comprising a playback device and a user interface device comprising: a non-flexible part; at least one flexible part coupled to the non-flexible part; and at least one sensor, for detecting bending of a respective flexible part with respect to the non-flexible part, and for producing a command in response to sensing bending of the respective flexible part.

This allows a user to interact with the user interface device by bending a flexible part, while simultaneously maintaining a secure grip on the user interface device by holding the non-flexible part. Furthermore, by providing a non-flexible part coupled to the flexible part, unnecessary expense can be avoided in that there is no requirement for all components of the user interface device to be flexible. As a result the device can be small enough for the convenience of the user whilst not hindering the transfer of commands, for example, it can be manipulated by one hand. Further, the device is formed of a small number of parts whilst offering a large variability of the number of functions (or commands) that can be implemented. Further, the device is easy to use as commands are generated using intuitive gestures of the user.

The sensors may be piezoelectric sensors or they may comprise quantum tunnelling composites, switches and other analogue/digital sensors can also be used for this purpose.

The sensors may be coupled to the non-flexible part and the flexible part. The sensors may be configured to sense bending at an interface between the flexible parts and the non-flexible part. Thus increasing the sensitivity of the device by degrees of movement to generate a variety of commands from a simple device.

The flexible parts may comprise a polymer such as silicone or rubber or other similar, widely available and inexpensive materials.

Detecting the bending of the flexible part may comprise detecting a change in voltage produced by deformation of a piezoelectric material, or detecting a change in current passed by a quantum tunnelling composite upon deformation. In this way a simple and effective technique is utilised to detect bending and generate a command as required.

The command may control content playback in an associated playback device.

BRIEF DESCRIPTION OF DRAWINGS

For a better understanding of the present invention, and to show more clearly how it may be carried into effect, reference will now be made, by way of example, to the following drawings, in which.

DETAILED DESCRIPTION OF EMBODIMENTS OF THE INVENTION

Figure 1:
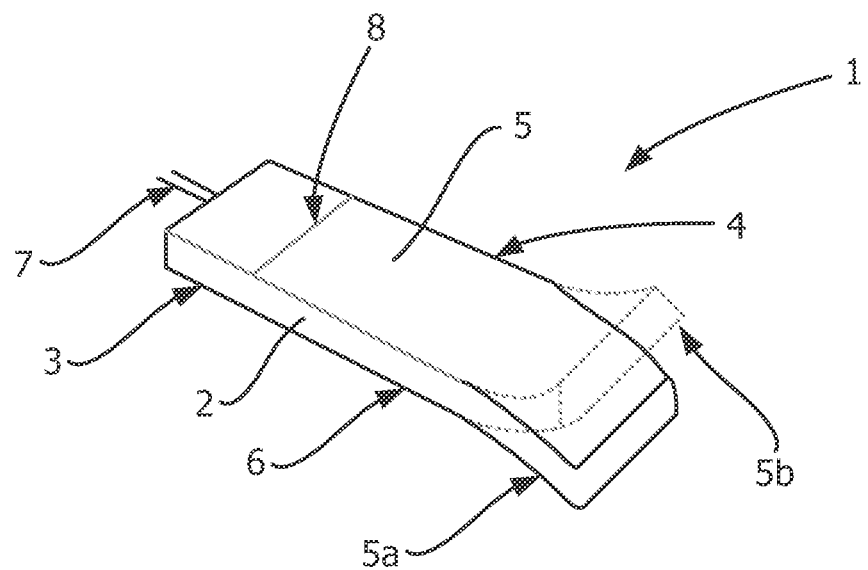
FIG. 1 shows a perspective view of a first embodiment of the present invention.

Referring to FIG. 1, a user interface device 1 comprises a substantially rectangular member 2 having substantially planar upper and lower surfaces 4 and 6. The rectangular member 2 comprises a base portion 3 constructed to be non-flexible and a flexible portion 5 formed from a polymer such as silicone or rubber. The user interface device 1 further comprises a wire 7 extending from the base portion 3 for connecting the user interface device 1 to a music playback device or the like (not shown).

The flexible portion 5 may be deflected from a non-bent position 5a into a bent position 5b upon the application of a force from a user in a direction perpendicular to the plane of the upper and lower surfaces 4, 6 of the rectangular member 2. At least one sensor (not shown) inside the user interface device 1 detects the deflection and produces a command that is transmitted down the wire 7 to the music playback device.

The sensor may comprise a piezoelectric sensor or a quantum tunnelling composite or the like or a combination of these sensors for sensing bending of the flexible portion 5 with respect of the base portion 3 at the interface 8 between the flexible portion 5 and the base portion 3. Switches and other analogue/digital sensors can also be used for this purpose.

Figure 2:
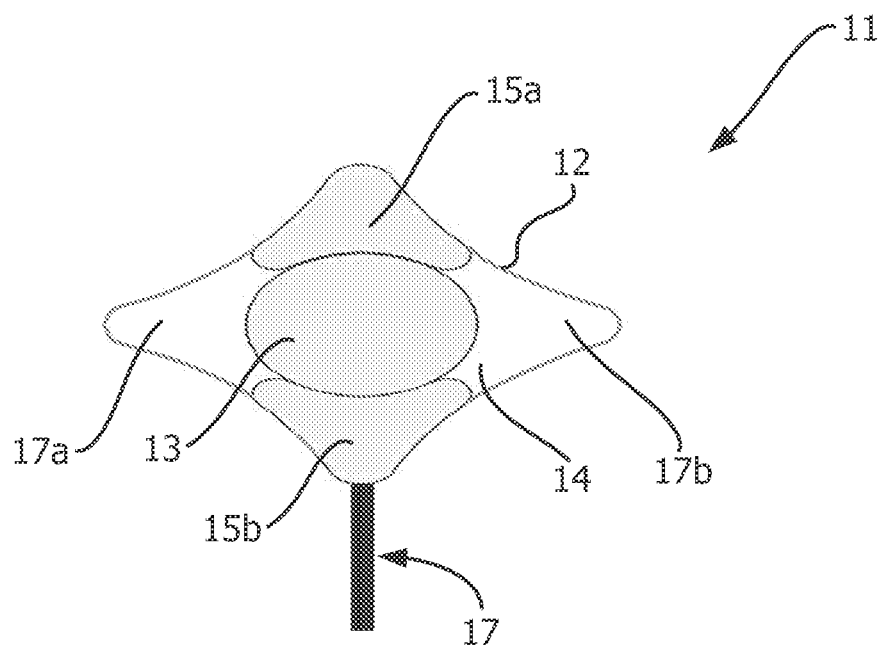
FIG. 2 shows a plan view of a second embodiment of the present invention.

FIG. 2 shows an alternative user interface device 11 comprising a generally square member 12 having substantially planar upper and lower surfaces 14. The member 12 comprises a central, base portion 13 which is non-flexible. At least one corner 17a, 17b of the square member 12 is formed of a flexible material such as a polymer or the like. The remaining corners 15a, 15b are non-flexible such that the base portion 13, and the corners 15a and 15b from a non-flexible part. In the embodiment, as shown in FIG. 2, two opposite corners 17a, 17b, either side of the base portion 13 are flexible in either direction perpendicular to the plane of the upper surface 14 of the square member 12, i.e. bendable with respect to the non-flexible part. Although only two corners are flexible in this embodiment, it can be appreciated that any number or any combination of the four corners 15a, 15b, 17a, 17b may be flexible. Further, although a four-cornered 15a, 15b, 17a, 17b shape 12 is illustrated in FIG. 2, it can be appreciated that any shape could be used, providing any number of flexible portions extending from a central non-flexible part. The user interface device 11 further comprises a wire 17 extending from the base portion 13 for connecting the user interface device 11 to a music playback device or the like (not shown).

The user interface device 11 further comprises at least one sensor (not shown) for detecting bending of at least one flexible part 17a, 17b with respect to the non-flexible part 13, 15a, 15b. The sensor may comprise piezo foils attached to the base portion 13, and extending towards the distal part of the flexible corners 17a, 17b. The piezo foils are protected by rubber moulding whilst providing improved interface to the user. Use of piezo foils as a sensor, enables bending action to be measured and the direction of bending to be measured, allowing for twice as many functions (or commands) to be accommodated.

Alternatively, the sensor may comprise a quantum tunnelling composite to sense bending of the flexible parts 17a, 17b with respect to the base portion 13. Use of such sensors makes manufacturing of the device simpler. However, with such a device, the direction of bending cannot be detected. In order to enable direction of bending to be detected, the sensing device is double-layered to measure in both bending directions.

In place of the piezo devices or quantum tunnelling composite, switches and other analogue/digital sensors can be used.

In use, the flexible parts 17a, 17b are deflected from their respective non-bent positions into respective bent positions, either independently or together, upon the application of a force from a user. A first sensor (not shown but described above) inside the user interface device 1 detects deflection of one of the flexible parts 17a and produces a command that is transmitted down the wire 7 to the music playback device. A second sensor (not shown but described above) inside the user interface device 1 detects deflection of the other one of the flexible parts 17b and produces a second command that is transmitted down the wire 7 to the music playback device.

Although embodiments of the present invention have been illustrated in the accompanying drawings and described in the foregoing detailed description, it will be understood that the invention is not limited to the embodiments disclosed, but is capable of numerous modifications without departing from the scope of the invention as set out in the following claims.

'Means', as will be apparent to a person skilled in the art, are meant to include any hardware (such as separate or integrated circuits or electronic elements) or software (such as programs or parts of programs) which reproduce in operation or are designed to reproduce a specified function, be it solely or in conjunction with other functions, be it in isolation or in co-operation with other elements. The invention can be implemented by means of hardware comprising several distinct elements, and by means of a suitably programmed computer. In the apparatus claim enumerating several means, several of these means can be embodied by one and the same item of hardware. 'Computer program product' is to be understood to mean any software product stored on a computer-readable medium, such as a floppy disk, downloadable via a network, such as the Internet, or marketable in any other manner.

The invention claimed is:

1. A user interface device, comprising:
   a non-flexible part;
   an interface;
   at least one flexible part coupled to the non-flexible part along the interface, the non-flexible part extending outward at least in a direction away from the interface; and
   at least one sensor, configured to detect bending at the interface between a respective flexible part and non-flexible part, and to produce a command in response to the detected bending.

2. The user interface device of claim 1, wherein at least one of the at least one sensor is a piezoelectric sensor.

3. The user interface device of claim 1, wherein at least one of the at least one sensor comprises a quantum tunneling composite.

4. The user interface device of claim 1, wherein at least one of the at least one sensor is coupled to the non-flexible part and the flexible part.

5. The user interface device of claim 1, wherein at least one of the at least one flexible part comprises a polymer including one of silicone or rubber.

6. A method of controlling a device via a user interface device, the method comprising acts of:
   providing a user interface device including at least one sensor, a non-flexible part, an interface, and at least one flexible part coupled to the non-flexible part along the interface, the non-flexible part extending outward at least in a direction away from the interface;
   detecting with the sensor bending at the interface between the at least one flexible part and the non-flexible part; and
   producing a command in response to the detecting to control the device.

7. The method of claim 6, wherein detecting the bending of the flexible part comprises an act of detecting a change in voltage produced by deformation of a piezoelectric material.

8. The method of claim 6, wherein detecting the bending of the flexible part comprises an act of detecting a change in current passed by a quantum tunneling composite upon deformation.

9. The method of claim 6, wherein the command controls content playback in an associated playback device.

10. A content playback system, comprising a playback device and a user interface device comprising:
   a non-flexible part;
   an interface;
   at least one flexible part coupled to the non-flexible part along the interface, the non-flexible part extending outward at least in a direction away from the interface; and at least one sensor, configured to detect bending at the interface between a respective flexible part and the non-flexible part, and to produce a command in response to the detected bending.

11. The user interface device of claim 1, wherein the at least one flexible part comprises at least two flexible parts coupled to the non-flexible part along corresponding different interfaces and the at least one sensor is configured to detect bending at each of the interfaces between the respective flexible part and non-flexible part, and to produce a different command in response to the each of the detected bendings.

12. The method of claim 6, wherein providing a user interface device comprises an act of providing at least two flexible parts coupled to the non-flexible part along corresponding different interfaces and the acts of detecting and producing comprises acts of detecting bending at each of the interfaces between the respective flexible part and non-flexible part, and producing a different command in response to the each of the detected bendings.

13. The content playback system of claim 10, wherein the at least one flexible part comprises at least two flexible parts coupled to the non-flexible part along corresponding different interfaces and the at least one sensor is configured to detect bending at each of the interfaces between the respective flexible part and non-flexible part, and to produce a different command in response to the each of the detected bendings.

* * * * *